Feb. 8, 1944. G. CHALUPA 2,340,932
ELECTRIC SHORTENING DISPENSER
Filed Feb. 1, 1941
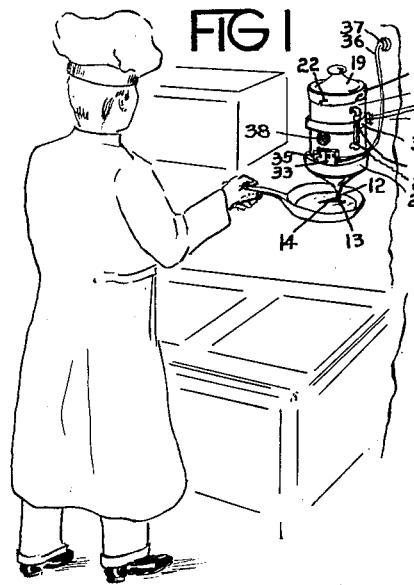
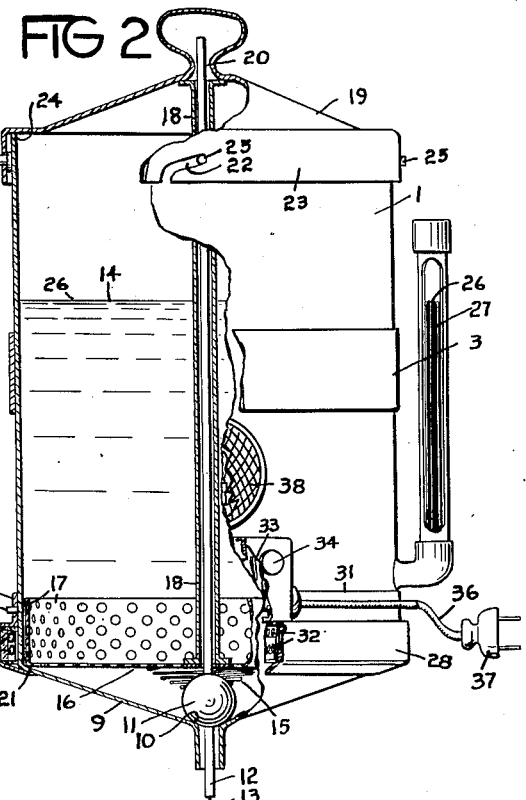
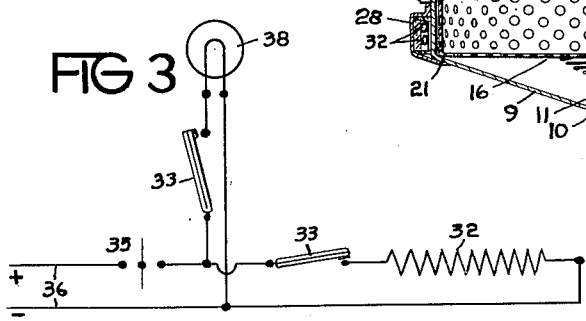
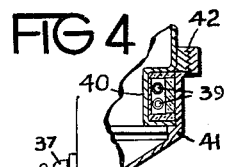
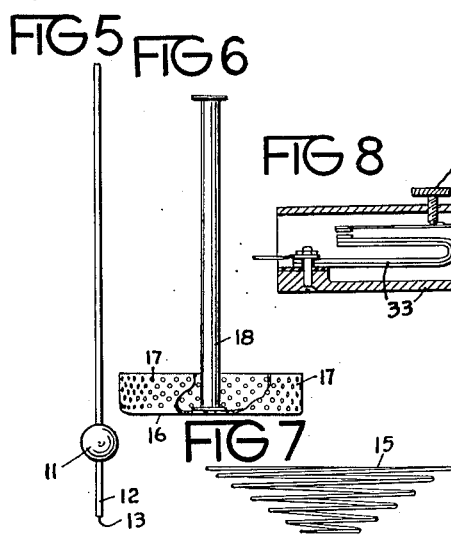
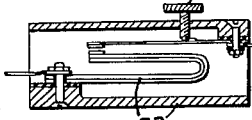
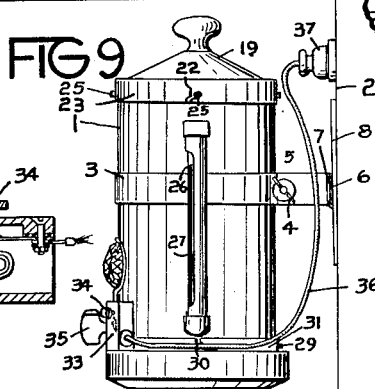
INVENTOR.
GEORGE CHALUPA.
BY
Paul A. Talbot.
ATTORNEY.

Patented Feb. 8, 1944

2,340,932

UNITED STATES PATENT OFFICE 2,340,932

ELECTRIC SHORTENING DISPENSER

George Chalupa, New York, N. Y.

Application February 1, 1941, Serial No. 376,957

10 Claims. (Cl. 219—19)

My invention relates to a device for dispensing shortening and particularly to a container which may be heated to reduce the viscosity of fats and oils and to automatically dispense the shortening by pressing against the bottom valve. Among the purposes and objects are to provide:

A convenient dispenser for heated fats and oils.

A container for dispensing shortening by pressing the pan against the bottom of the container.

A container, heater, valve and signal combined to keep oils and fats at the desired temperature and to clean and dispense the heated oils conveniently.

An oil and fat dispenser which is easily cleaned.

A device for heating and straining shortening.

A wall shortening dispenser for kitchens and galleys.

I accomplish these and other objects by the construction herein described and shown in the accompanying drawing forming a part hereof in which:

Fig. 1 is a perspective view showing the application of my device.

Fig. 2 is an elevation and partial section.

Fig. 3 is a wiring diagram of the electric circuits.

Fig. 4 is a fragmentary detail of a modification of a detachable bottom and internal electric heater.

Fig. 5 is a detail of the valve.

Fig. 6 is a detail of the valve tube.

Fig. 7 is a detail of the valve spring.

Fig. 8 is a detail of one of the thermostats.

Fig. 9 is an elevation of my device.

Similar reference characters refer to similar parts throughout the several views of the drawing and in the specification to follow.

The preparation and dispensing of shortening for cooking, particularly for uses in restaurants and where time is a factor, the difficulties include heating the fats and oils separating skin and other solids which will not liquefy, and the desirability of keeping the shortening in liquid form so that it may be quickly applied in the desired amount. A knife or spoon is required when the shortening is not in liquid form.

By the use of my device, fats of various types may be separated from the solid matter and maintained in liquid form so that it will flow from the container into the dish or pan as desired without dipping or turning a valve or without pouring the oil, if in a can, which requires opening the can and handling it. The user merely presses the pan against the spring seated valve and the shortening flows until the pan is removed, all of which is made possible without handling the container.

The temperature is maintained as desired and is automatically regulated. A signal shows when the heat desired is exceeded and the solids are removed and strained from the shortening, and the strainer, valve, and container may be cleaned without the use of tools or implements.

The entire device may be attached or removed from the wall where it is secured during normal use. The amount of shortening in the container is visible to the user, and when empty, may be easily refilled without handling, when desired.

The chef or cook may save time and extra effort as the shortening is at all times in condition for immediate use.

In the drawing and specification, I have illustrated and described in detail my preferred construction which embodies the principles underlying my invention. To those skilled in the art to which this invention pertains, after a study of this detailed disclosure, modifications may be apparent which may suit my invention to the numerous uses to which it is adapted. This detailed disclosure is not intended to limit or restrict but rather to illustrate one of the embodiments of the principles which underly my invention, which is set forth in the appended claims.

Referring to the drawing, I have provided a container 1 which may be detachably secured to the wall 2 by the clamp strap 3 which may be removed by unscrewing the wing nut 4 of the clamp screw 5. The ends 6 of the clamp strap are preferably bent outwardly at ninety degrees to form lugs suitable to engage the upwardly disposed hooks 7 of the wall bracket 8, thereby permitting the free removal of the container from the wall by lifting the end lugs 6 of the clamp strap from and out of the hooks 7.

The container 1 is preferably provided with an inclined bottom end 9 and a valve seat 10 on which the valve 11 normally rests and through which the valve stem 12 extends to the exterior of the container to provide a means for lifting the valve by pressing the dish or pan against the lower end 13 of said stem, permitting a flow of shortening 14 from the container.

The valve 11 is preferably held against its seat 10 by the spring 15, one end of which rests on the top of the valve and the other end of the spring against the under surface of the strainer 16 which is disposed within and forms a removable inner bottom to said container.

The strainer 16 is preferably flanged upwardly to provide side walls 17 and may be secured to the holding down tube 18, the top end of which is normally held against the cover 19.

The valve stem 12 may be extended above the valve 11 through the tube 18 and into the guide aperture 20 in the cover which, when secured in place, guides the valve and overcomes the spring 15, permitting the strainer to rest against the bottom inner periphery 21 of the container 1, and also thus holding the valve against its seat in addition to the gravity or weight of the valve and valve stem.

The cover 19 may be removably secured in place by the plurality of inclined slots 22 in its downwardly depending flanged edge 23 which slips over and around the top edge 24 of the container 1 which is provided with the pins or lugs 25 which engage said slots 22 to firmly lock the cover in place when slightly turned in one direction and permitting the cover to be removed when it is turned in the opposite direction.

Upon removing the cover, the strainer 16 may be lifted out of the container by means of the tube 18. The valve 11 and spring 15 may likewise be removed by lifting it out by the valve stem 12. The container and the strainer may thus be easily cleaned, as its inner surface is smooth and accessible.

The liquid level 26 may be readily determined by the guage glass 27 visible on the exterior of the container. When the container is made of heat resisting glass, the guage glass may be eliminated.

Detachably secured to the exterior of the bottom of the container, I have provided the heater housing 28 which is preferably insulated electrically and against heat radiation and is detachably secured to the container 1 by a plurality of lugs 29 which engage inclined slots 30 provided in the upwardly extended flange 31 of the housing 28.

Within the housing 28, I have provided the electric heater elements 32 which are disposed around the bottom exterior of the container 1 to heat the container and its contents of shortening. The temperature of the heater is controlled and maintained by the electric thermostat 33 which is adjusted by the screw 34. The thermostat is secured to the housing and held in contact with the container, the heat from which is carried to the thermostat by the conductivity of its outer wall.

A switch 35 is also provided to control and shut off and turn on electric current from and to the heating elements 32. Electric current to the heating elements and the electric parts may be supplied by the electric cord 36 and plug 37 in the usual manner.

To inform the user of the fact that the container and its contents are heated, I have provided the illuminated signal 38 which may also be controlled by a thermostat similar to the one used to regulate the heating elements 32, the details of which are shown in Fig. 8 of the drawing.

The signal, thermostats, switch, and heating elements may all be secured to and removable with the housing 28.

In Fig. 4, I have shown a modification in which the heating elements 39 are housed in the offset bottom wall of the container 40. The bottom 41 may be detachably secured by the threads 42.

Numerous other modifications may be made to the details of construction herein disclosed, without departing from the underlying principles of my invention as set forth in the appended claims.

I claim as my invention:

1. In a shortening dispenser, a container having an outlet for liquids at the bottom thereof, a strainer above said outlet removably held across said container and having upturned peripheral edges to hold solids, a valve closing said outlet disposed below said strainer and above said outlet and a valve stem projecting below said outlet to operate said valve and above said strainer to lift said strained and the contents caught in said strainer upwardly and out of said container, whereby the strainer and valve may be removed while hot.

2. In a shortening dispenser, a container having an outlet for liquids at the bottom thereof, a strainer above said outlet removably held across said container and having upturned peripheral edges to hold solids, a valve closing said outlet disposed below said strainer and above said outlet and a valve stem projecting below said outlet to operate said valve and above said strainer to lift said strainer and the contents caught in said strainer upwardly and out of said container, whereby the strainer and valve may be removed while hot, and a spring resting against the bottom of said strainer and on said valve to hold said valve yieldingly against its seat and placed under pressure by said cover.

3. In an electrically heated dispenser for rendering oil from fats controlled to maintain heated oil and having oil level indicating means, a container for receiving the fat having an outlet at the bottom, a strainer having upturned side walls to hold solids in said strainer and a valve at the bottom of said container seated to close said outlet and a cover at the top of and removable to fill said container, a valve stem guided by said cover secured to said valve and projecting down through said outlet to operate said valve, said valve stem being suitable to lift said valve and strainer out of said container to remove the solids from said strainer while hot, said cover holding said strainer in place.

4. In a dispenser for shortening having electric heating means, a strainer for holding and removing solids from said dispenser, a valve and operating means projecting below said dispenser and a plug in cord to supply current thereto, a wall bracket having upwardly disposed hooks and lugs secured to said dispenser engaging said hooks to detachably secure the dispenser to the wall, said plug in cord and wall bracket permitting the free removal of said dispenser from the wall.

5. In a fat rendering and dispensing device, a container having heating means and an outlet at the bottom and a strainer for separating and removing the solids from the fat and a valve yieldingly closing said outlet, a cover for said container at its upper end, and means holding said strainer in place by said cover and removing said strainer and the solids therein after removing said cover.

6. In a fat rendering and dispensing device, a container having heating means and an outlet at the bottom and a strainer for separating and removing the solids from the fat and a valve yieldingly closing said outlet, a cover for said container at its upper end, and means holding said strainer in place by said cover and removing said strainer and the solids therein after removing said cover, said holding means removable by removing said cover.

7. In a fat rendering and dispensing device, a container having heating means and an outlet at the bottom and a strainer for separating and removing the solids from the fat and a valve yieldingly closing said outlet, a cover for said container at its upper end, and means holding said strainer in place by said cover and removing said strainer and the solids therein after removing said cover, said holding means and said cover permitting the free removal of said strainer and its contents and said valve by the removal of said cover.

8. In a fat rendering and dispensing device, a container having a bottom outlet, a spring pressed valve closing said outlet and a strainer in the lower end of said container and removable through the upper end of the container suitable to remove the solids from the fats being rendered, a cover at the upper end of said container, and a holding down means between said cover and said strainer holding said valve, spring and strainer in place at the lower end of said container and permitting the free removal of said valve, spring and strainer and its contents while hot from the top by the removal of said cover.

9. In a fat rendering and dispensing device, a container having a bottom outlet, a spring pressed valve closing said outlet and a strainer in the lower end of said container and removable through the upper end of the container suitable to remove the solids from the fats being rendered, a cover at the upper end of said container, and a holding down means between said cover and said strainer holding said valve, spring and strainer in place at the lower end of said container and permitting the free removal of said valve, spring and strainer and its contents while hot from the top by the removal of said cover and a valve stem secured to said valve projecting upwardly and guided by said cover adapted to remove said valve and strainer and its contents.

10. In a fat rendering and dispensing device, a container having a bottom outlet, a spring pressed valve closing said outlet and a strainer in the lower end of said container and removable through the upper end of the container suitable to remove the solids from the fats being rendered, a cover at the upper end of said container, and a holding down means between said cover and said strainer holding said valve, spring and strainer in place at the lower end of said container and permitting the free removal of said valve, spring and strainer and its contents while hot from the top by the removal of said cover and a valve stem secured to said valve projecting upwardly and guided by said cover adapted to remove said valve and strainer and its contents, said valve stem projecting downwardly through said outlet and below said container to open said valve by upward pressure on the bottom end of said valve stem.

GEORGE CHALUPA.